J. L. SPARLING.

JOINT CHAIR.

APPLICATION FILED DEC. 5, 1916.

Reissued Mar. 13, 1917.

14,272.

Inventor

Jacob L. Sparling,

By S. P. Volkamer

Attorney

UNITED STATES PATENT OFFICE.

JACOB LAWRENCE SPARLING, OF BAY CITY, MICHIGAN, ASSIGNOR TO THE RAIL JOINT COMPANY, A CORPORATION OF NEW YORK.

JOINT-CHAIR.

14,272. Specification of Reissued Letters Patent. Reissued Mar. 13, 1917.

Original No. 1,064,559, dated June 10, 1913, Serial No. 661,772, filed November 22, 1911. Application for reissue filed December 5, 1916. Serial No. 135,150.

*To all whom it may concern:*

Be it known that I, JACOB L. SPARLING, a citizen of the United States, residing at Bay City, in the county of Bay and State of Michigan, have invented new and useful Improvements in Joint-Chairs, of which the following is a specification.

This invention relates to joint chairs and the object of the invention is to provide a simple and efficient device of this character which will firmly hold the ends of the rails together and which will support the ends of the rails so that their parts may be even at all times and will thus prevent hammering or knocking at the joints.

A further object of the invention is to provide a novel fish plate connector which extends beneath the rail and connects the fish plates in such a manner that the pressure upon the connector will act to spread the upper portions of the plates against the bolts so that a train traveling over the joint tends to tighten up on the bolts rather than loosen upon the same.

Further objects of the invention will appear as the following specific description is read in connection with the accompanying drawing, which forms a part of this application, and in which:—

Figure 1:
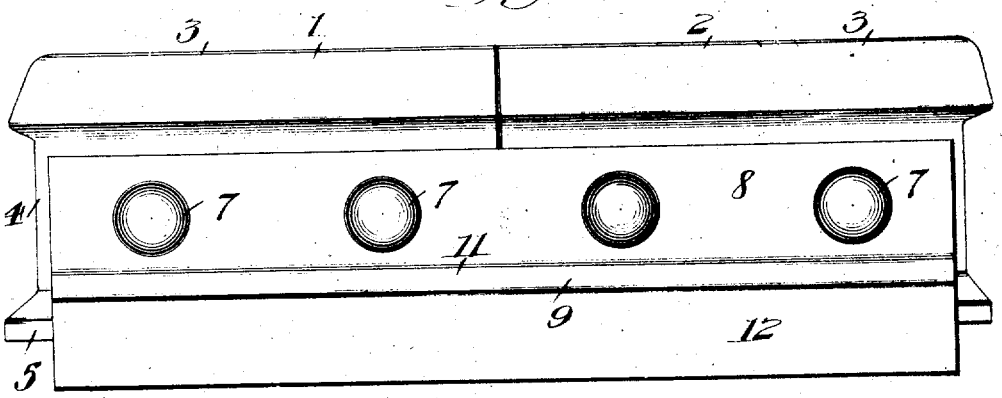
Figure 1 is a side elevation.

Referring more particularly to the drawing, 1 and 2 represent the separate ends of the rails to be connected. Each of these rails comprises a head 3, a web 4, and base flanges 5 extending laterally from the web. The webs are apertured, as is usual, as shown at 6, to receive the connecting bolts 7 which pass through substantially vertical flanges 8 formed on the fish plate members, 9 and 10. The vertical flanges 8 have extending therefrom at an obtuse angle base flanges 11 which lie on top of the base flanges 5 of the rail and are connected to the L-shaped flanges 12. The long leg of the L-shaped flange extends down below the base flange and the short leg or base member of the L-shaped flange is provided with an inclined seat 13 adapted to engage a similar seat 14 on the extension 15 carried by the connecting base plate 16. This connecting plate is arranged beneath the rail base and is held in such position by means of the short legs of the L-shaped flanges.

Figure 2:
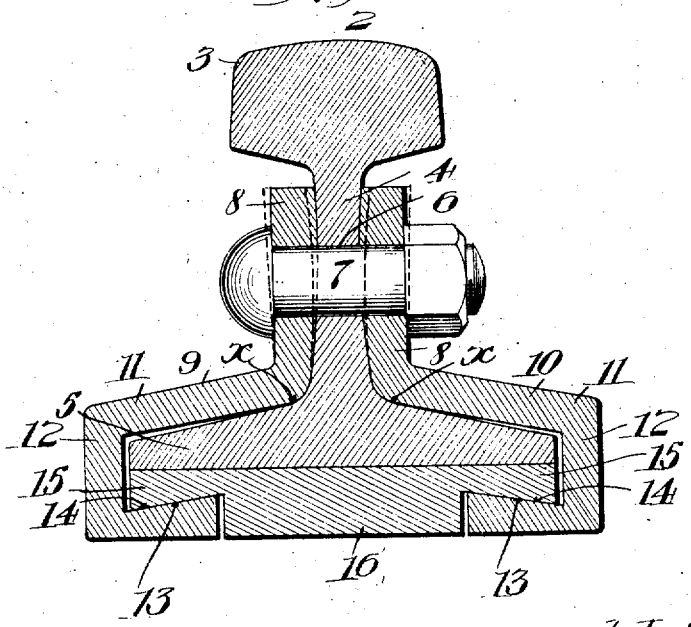
Fig. 2 is a transverse sectional view.

It will be noticed in Fig. 2 that the flanges 8 are not exactly vertical, but when applied to the rail, slightly diverge from the web starting at a point "*x*" at the juncture of the flanges 8 and 11. When the bolts 7 are drawn up, the flanges are brought together toward the web of the rail and fulcrum at the point of the base flange, thus drawing the short legs of the flanges 12 away from the connecting plate 16. This action causes a wedging action between the seats 13 and 14 and presses the connecting plate against the underneath side of the base flanges. Any weight applied to the rail will act to depress the connecting plate 16, which action causes the seat 14 to slide over the seat 13 and draw the flanges 12 toward each other, thereby spreading the flanges 8 against the nuts and heads of the bolts. Thus the weight of the cars upon the rail acts to tighten the bolt instead of loosening the same.

What is claimed is:

1. In a joint chair, the combination with rail ends to be connected, of fish plates mounted upon opposite sides of the rail, bolts for connecting the fish plates to the rail, flanges carried by the fish plates and extending beneath the rail and having upwardly and inwardly inclined seats, a connector plate, and inclined seats on the connector plate engaging the inclined seats on the flanges and adapted to draw the flanges together when pressure is applied to the rail.

2. In a joint chair, the combination with rail ends to be connected, of fish plate members having bodies lying upon the base flanges of the rail, bolt flanges extending at an angle therefrom and diverging from the web of the rail, L-shaped flanges connected to the bodies and having a portion extending beneath the base flanges of the rail and being provided with inclined seats adapted to form with the base of the rail half dovetail grooves, a connector plate arranged beneath the rails and having half dovetail extensions to lie in said grooves and engage said seats of the L-shaped flange and to slide thereon, and bolts passing through the bolt flanges and the webs of the rails.

3. A rail joint including, in combination with the rails and the joint bolts, fish plates receiving the bolts, and a connector arranged beneath the rails and having an operating engagement with the fish plates to cause outward movement of their bolt-receiving members upon application of downward pressure upon the connector.

4. A rail joint including in combination the rails and the joint bolts, fish plates having upright members and base portions, and a connector arranged beneath the rails and having an operating engagement with the base portions of the fish plates to cause the upright members thereof to move outward upon application of downward pressure on the connector.

5. A rail joint including, in combination with the rails and the joint bolts, fish plates having upright members and base portions, and a connector arranged beneath the rails and having a wedging engagement with said base portions of the fish plates to cause the upright members thereof to move outwardly into binding engagement with the bolts upon application of downward pressure on the connector.

6. A rail joint including in combination with the rails and the joint bolts, fish plates fulcrumed on the rail flanges and having depending flange portions, and a base plate having wedging elements interlocking with said flange portions and arranged to cause the latter to move inwardly and said upright members to move outwardly upon application of downward pressure on the base plate.

In testimony whereof I hereunto affix my signature in the presence of two witnesses.

JACOB LAWRENCE SPARLING.

Witnesses:

George F. Knisely, Sr.

F. Prell.